United States Patent
Kim et al.

(10) Patent No.: US 9,599,846 B2
(45) Date of Patent: Mar. 21, 2017

(54) METHOD OF SWITCHING GUEST-HOST DUAL FREQUENCY LIQUID CRYSTAL BY USING BACK FLOW

(71) Applicant: SAMSUNG ELECTRONICS CO., LTD., Suwon-si (KR)

(72) Inventors: Sun-kwon Kim, Suwon-si (KR);
Do-kyoon Kim, Seongnam-si (KR);
Kee-chang Lee, Yongin-si (KR); Glenn Mangelinckx, Ghent (BE); Jeroen Beeckman, Ghent (BE)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 212 days.

(21) Appl. No.: 14/328,872

(22) Filed: Jul. 11, 2014

(65) Prior Publication Data
US 2015/0015818 A1    Jan. 15, 2015

(30) Foreign Application Priority Data

Jul. 12, 2013    (KR) ......................... 10-2013-0082297

(51) Int. Cl.
| | |
|---|---|
| G02F 1/13 | (2006.01) |
| G02F 1/133 | (2006.01) |
| C09K 19/60 | (2006.01) |
| G02F 1/137 | (2006.01) |

(Continued)

(52) U.S. Cl.
CPC ........ *G02F 1/13306* (2013.01); *G02F 1/1392* (2013.01); *G02F 1/13725* (2013.01); *G02F 1/13475* (2013.01)

(58) Field of Classification Search
CPC .................................................. G02F 1/13475
See application file for complete search history.

(56) References Cited

U.S. PATENT DOCUMENTS

| | | |
|---|---|---|
| 2004/0150598 A1 | 8/2004 | Golovin et al. |
| 2005/0253111 A1 | 11/2005 | Raja et al. |

(Continued)

FOREIGN PATENT DOCUMENTS

KR    10-2011-0032216 A    3/2011

OTHER PUBLICATIONS

Pieter J.M. Vanbrabant et al., "Effect of material properties on reverse flow in nematic liquid crystal devices with homeotropic alignment", 2009.

(Continued)

*Primary Examiner* — Wen-Ying P Chen
(74) *Attorney, Agent, or Firm* — Harness, Dickey & Pierce, P.L.C.

(57) ABSTRACT

Provided are methods of switching guest-host dual frequency liquid crystals by using a back flow. In the case of a shutter having a dual frequency liquid crystal layer between two transparent substrates, such a method includes: applying a first voltage having a first frequency to the dual frequency liquid crystal layer; and applying a second voltage having a second frequency to the dual frequency liquid crystal, the second frequency being higher than the first frequency, wherein the second voltage is higher than a threshold voltage that generates a back flow around liquid crystals of the dual frequency liquid crystal layer, and the first voltage is lower than the threshold voltage.

9 Claims, 4 Drawing Sheets

(51) Int. Cl.
*G02F 1/139* (2006.01)
*G02F 1/1347* (2006.01)

(56) References Cited

U.S. PATENT DOCUMENTS

2007/0278449 A1* 12/2007 Takaku .............. C09K 19/2007
　　　　　　　　　　　　　　　　　　　　252/299.01
2010/0315567 A1　12/2010　Wen et al.
2011/0001896 A1　 1/2011　Wen et al.

OTHER PUBLICATIONS

Pieter J.M. Vanbrabant et al. "Temperature influence on the dynamics of vertically aligned liquid crystal displays", 2008.

* cited by examiner

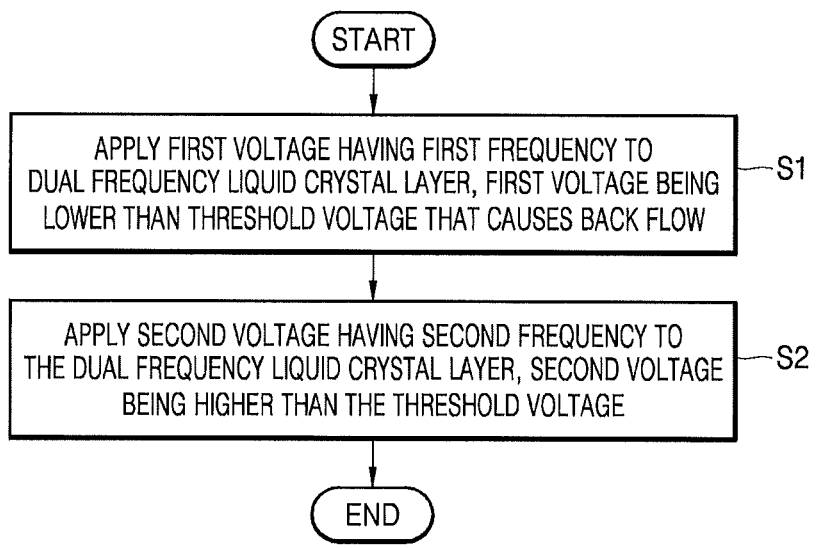
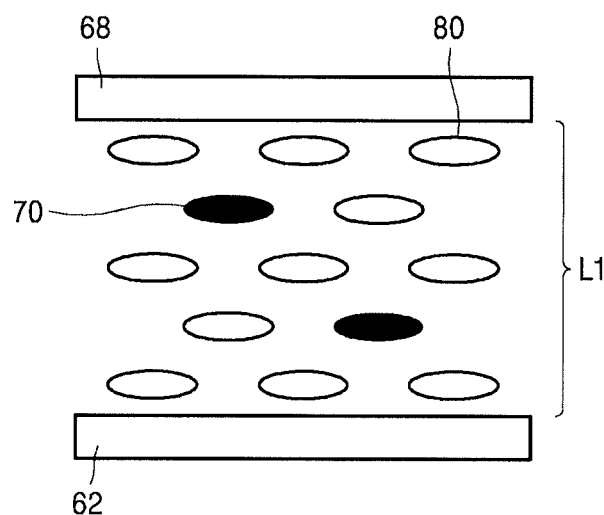

METHOD OF SWITCHING GUEST-HOST DUAL FREQUENCY LIQUID CRYSTAL BY USING BACK FLOW

CROSS-REFERENCE TO RELATED APPLICATIONS

This application claims the benefit of Korean Patent Application No. 10-2013-0082297, filed on Jul. 12, 2013, in the Korean Intellectual Property Office, the disclosure of which is incorporated herein in its entirety by reference.

BACKGROUND

1. Field

The present disclosure relates to methods of high speed switching a liquid crystal, and more particularly, to methods of switching a guest-host dual frequency liquid crystal by using a back flow.

2. Description of the Related Art

Optical shutters, three-dimensional (3D) glasses for 3D cinemas, and shutters for recording 3D images perform ON/OFF switching for all incident visible light or a portion of the incident visible light. The switching may be fast and may have high transmissivity and high contrast while being independent from polarization of the incident visible light.

Most optical shutters are based on a liquid crystal (LC) technology and include a polarizer. Due to the polarizer, the optical transmittance of the shutter may be limited to 50%.

A dielectric characteristic of an LC becomes anisotropic when a low frequency voltage is applied thereto. The anisotropy may be expressed as a difference between an electric permittivity along an axis of the LC and an electric permittivity of a direction perpendicular to the axis of the LC. A representative value indicating the anisotropy may be positive or negative in a wide frequency range (from Hz to MHz).

Also, a dual-frequency liquid crystal (DFLC) shows a positive dielectric anisotropy at a voltage with a frequency lower than a transition frequency (fc) (for example, 10 KHz). The DFLC shows a negative dielectric anisotropy at a voltage with a frequency higher than the fc.

Due to the above characteristics, a horizontal state LC may be rapidly switched to a vertical state LC by applying thereto a low frequency voltage (<10 KHz), and a vertical state LC may be rapidly switched to a horizontal state LC by applying thereto a high frequency voltage (>10 KHz).

Switching of an LC induces a flow around the LC. The velocity of the flow is very small. Accordingly, the switching of the LC may not be affected by the flow. However, in some cases, the switching of the LC may be slightly accelerated by the flow. The flow at this time is referred to as a forward flow.

On the other hand, the switching may be slightly slower due to the flow. The flow at this time is referred to as a back flow or a reverse flow.

SUMMARY

Provided are methods of switching a guest-host dual frequency liquid crystal by using a back flow, thereby achieving high speed switching in a sub-millisecond range.

Additional aspects will be set forth in part in the description which follows and, in part, will be apparent from the description, or may be learned by practice of the presented example embodiments.

According to an example embodiment, there is provided a method of switching dual frequency liquid crystals of a shutter having a dual frequency liquid crystal layer between two transparent substrates, the method including: applying a first voltage having a first frequency to the dual frequency liquid crystal layer; and applying a second voltage having a second frequency to the dual frequency liquid crystal, the second frequency being higher than the first frequency, wherein the second voltage is higher than a threshold voltage that generates a back flow around liquid crystals of the dual frequency liquid crystal layer, and the first voltage is lower than the threshold voltage.

The dual frequency liquid crystal layer may include an optical absorption dye.

The first voltage may have a form of a square wave.

The second voltage may have a form of a sine wave.

According to another example embodiment, there is provided a method of switching dual frequency liquid crystals of a shutter having a dual frequency liquid crystal layer between two transparent substrates, the method including: changing a state of the dual frequency liquid crystal layer so that an optical transmission of the dual frequency liquid crystal layer is increased; and twisting the dual frequency liquid crystal layer to 360° by generating a strong back flow around the liquid crystals of the dual frequency liquid crystal layer.

In the changing of the state of the dual frequency liquid crystal layer, liquid crystals of the dual frequency liquid crystal layer may be changed from a horizontal state to a homeotropic state.

In a method of switching dual frequency liquid crystals of a shutter having a dual frequency liquid crystal (DFLC) layer between two transparent substrates, a DFLC is changed to an ON-state by applying thereto a low frequency voltage. Afterwards, a high frequency voltage greater than the threshold voltage that causes a back flow around the liquid crystals of the dual frequency liquid crystal layer is applied to the ON state DFLC, and thus, the liquid crystals in the DFLC that is affected by the back flow are excessively rotated. As a result, the DFLC is changed to an OFF state. Since the high frequency voltage greater than the threshold voltage and the back flow are applied to the LC at the same time, the LC may be switched faster than in the case when there is no back flow. As a result, the switching time of the DFLC is reduced, and thus, switching of liquid crystals in the sub-millisecond range may be realized.

BRIEF DESCRIPTION OF THE DRAWINGS

These and/or other aspects will become apparent and more readily appreciated from the following description of the embodiments, taken in conjunction with the accompanying drawings of which:

FIG. 5 is a flow diagram showing the method of switching guest-host dual frequency liquid crystal by using a back flow, according to an example embodiment; and FIG. 6 is a cross-sectional view showing a case in which a dye is mixed in DFLC cells.

DETAILED DESCRIPTION

Figure 1:
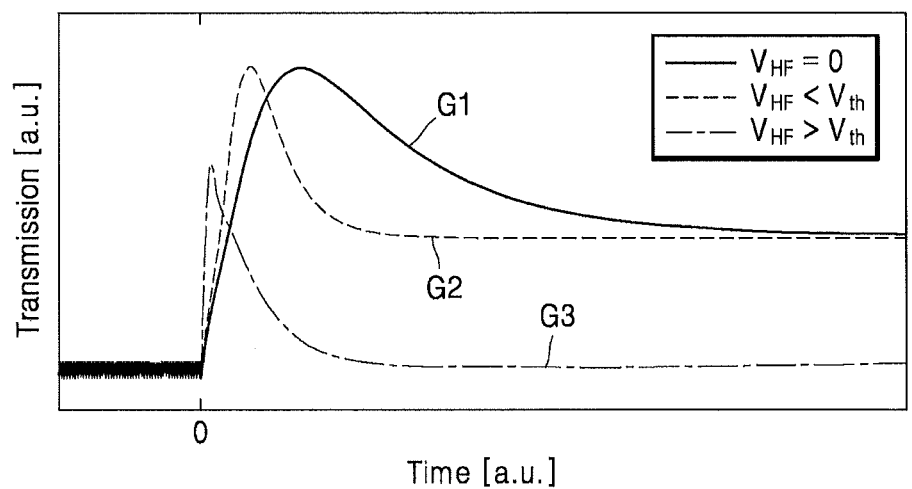
FIG. 1 is a graph showing a switching time characteristics of a dual-frequency liquid crystal (DFLC) according to a back flow and the magnitude of a high frequency voltage ($V_{HF}$)

Reference will now be made in detail to embodiments, examples of which are illustrated in the accompanying drawings. In the drawings, the thicknesses of layers and regions are exaggerated for clarity.

A method of switching a guest-host dual frequency liquid crystal by using a back flow according to an example embodiment may be applied to a method of switching a shutter including a dual frequency liquid crystal filled between two transparent substrates facing each other.

FIG. 1 is a graph showing switching time characteristics of a dual-frequency liquid crystal (DFLC) according to a back flow in and the magnitude of a high frequency voltage ($V_{HF}$).

In FIG. 1, a first graph G1 indicates a state ($V_{HF}$=0) when no high frequency voltage is applied after applying a low frequency voltage to the DFLC.

A second graph G2 indicates a state when a high frequency voltage that is lower than a threshold voltage ($V_{HF}$<Vth) at which a back flow occurs is applied after applying a low frequency voltage to the DFLC.

A third graph G3 indicates a state when a frequency voltage ($V_{HF}$>Vth) higher than a threshold voltage is applied after applying a low frequency voltage to the DFLC.

Referring to FIG. 1, when a low frequency voltage is applied to liquid crystals such as DFLCs, liquid crystals in a flat state, that is, in a horizontal state, are rotated into a vertical state and an optical transmittance thereof increases. At this time, no back flow occurs. When a high frequency voltage $V_{HF}$ is not applied (G1) after applying a low frequency voltage to the liquid crystals, the rotated liquid crystals slowly returns to the horizontal state due to an elastic effect.

When a high frequency voltage is applied to the rotated liquid crystals after applying a low frequency voltage (as in G2 and G3), the liquid crystals that are rotated from the horizontal state to the vertical state are switched back to the horizontal state from the vertical state. A switching time from the vertical state back to the horizontal state according to the application of a high frequency voltage is shorter (as in G2 and G3) than in a case when the high frequency voltage is not applied to the rotated liquid crystals (as in G1).

Upon comparing the first graph G1 and the third graph G3, it is apparent that the switching time of the liquid crystals is reduced when the applied high frequency voltage is greater than a threshold voltage. However, the switching state of the liquid crystals when the high frequency voltage is greater than the threshold voltage is different from a state when a low frequency voltage is applied.

The results of FIG. 1 are obtained by applying the low frequency voltage and the high frequency voltage described above to the liquid crystals after locating the DFLC cell between crossing polarizers. The DFLC cell may be two glass plates which are adhered to each other and in which liquid crystals are oriented in-parallel in a reverse direction from each other.

The occurrence of an OFF switching of liquid crystals in a DFLC may be confirmed as follows through a numerical simulation with respect to the results of FIG. 1.

The OFF switching of liquid crystals will now be described with reference to FIG. 2.

Figure 2:
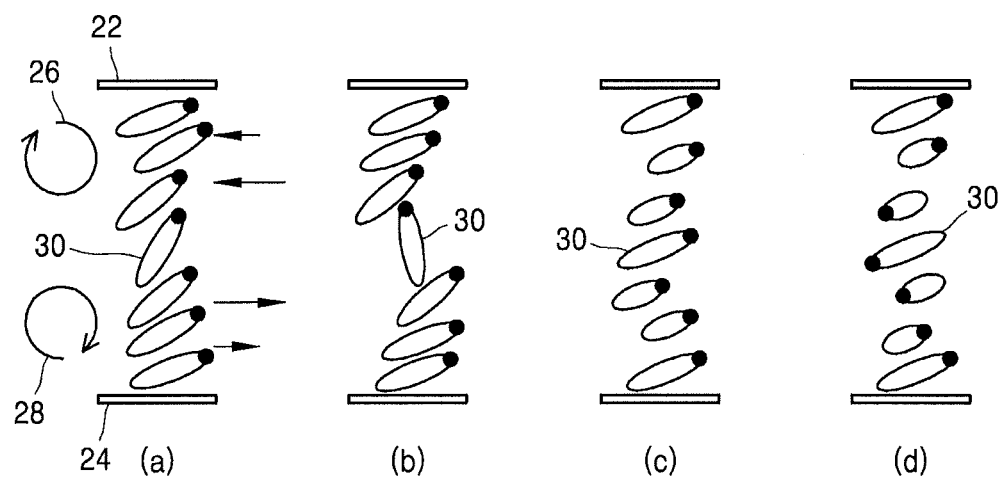
FIG. 2 is a cross-sectional view showing OFF switching (changing from a vertical state liquid crystal to a horizontal state liquid crystal) in the DFLC in consideration of a back flow of materials around the liquid crystal and a magnitude of the high frequency voltage.

As depicted in (a) in FIG. 2, when a high frequency voltage is applied to anisotropic liquid crystals that are vertical to glass substrates 22 and 24, the anisotropic liquid crystals are rotated and are arranged in parallel to the glass substrates 22 and 24. Flows 26 and 28 occur around the anisotropic liquid crystals due to the rotation of the liquid crystals. The flows 26 and 28 are examples, and the current embodiment is not limited thereto. The flows 26 and 28 may be reverse flows with respect to the central liquid crystal 30. That is, according to the application of the high frequency voltage, the central liquid crystal 30 tends to rotate in a clockwise direction. However, the central liquid crystal 30 tends to rotate in a counter clockwise direction due to the flows 26 and 28.

When a large low frequency voltage and a large high frequency voltage are applied to the liquid crystals, the flows 26 and 28 may act as a large reverse flow with respect to the central liquid crystal 30. That is, the central liquid crystal 30 may have a tilt angle greater than 90°. That is, as depicted in (b) of FIG. 2, the central liquid crystal 30 is completely rotated in a counter clockwise direction, and, as a result, may be arranged in a horizontal direction.

When the high frequency voltage applied to the DFLC is smaller than a threshold voltage ($V_{HF}$<$V_{th}$) (this corresponds to the second graph G2 of FIG. 1), as depicted in (c) of FIG. 2, a slight twist occurs in the DFLC (refer to the liquid crystals above and below the central liquid crystal 30). However, in the end, the tilt angle of the central liquid crystal 30 is smaller than 90°, and the central liquid crystal 30 is in a ground state, that is, in a horizontal state.

When the high frequency voltage applied to the DFLC is greater than the threshold voltage ($V_{HF}$>$V_{th}$) (this corresponds to the third graph G3 in FIG. 1), the central liquid crystal 30 in the middle part of the DFLC is excessively rotated and the central liquid crystal 30 is in a flat state, which is a 180° twisted state through a 180° twist of the liquid crystals above and below the central liquid crystal 30. As a result, as depicted in (d) in FIG. 2, the whole DFLC is in a metastable state, which is a 360° twisted state.

In this way, since the central liquid crystal 30 is in a flat state by rapidly rotating in a opposite direction from the original direction when the high frequency voltage greater than the threshold voltage and the back flow are applied to the central liquid crystal 30 simultaneously, the OFF switching time of the DFLC is shorter than in the case when no back flow occurs, and thus, the OFF switching time of the DFLC is in a sub-millisecond range.

The method of switching guest-host dual frequency liquid crystal by using a back flow according to an example embodiment will now be described.

A gap between the two glass substrate is filled with the DFLC in the DFLC cell used in the current example embodiment. At this point, the DFLC includes an optical absorption dye as a guest. The DFLC may be a host. The optical absorption dye may be 3 wt % cyan dichroic dye. In the current example embodiment, a polarizer is not used. Instead, light is irradiated onto the DFLC cell by using a polarization microscope. A blue light emitting diode (LED) array is used as a light source of the polarization microscope. The blue LED array has a peak wavelength of 468 nm. A power source may be used to apply a voltage to the DFLC cell. Light transmitted through the DFLC cell may be measured by using a device, for example, a photodiode.

Figure 3:
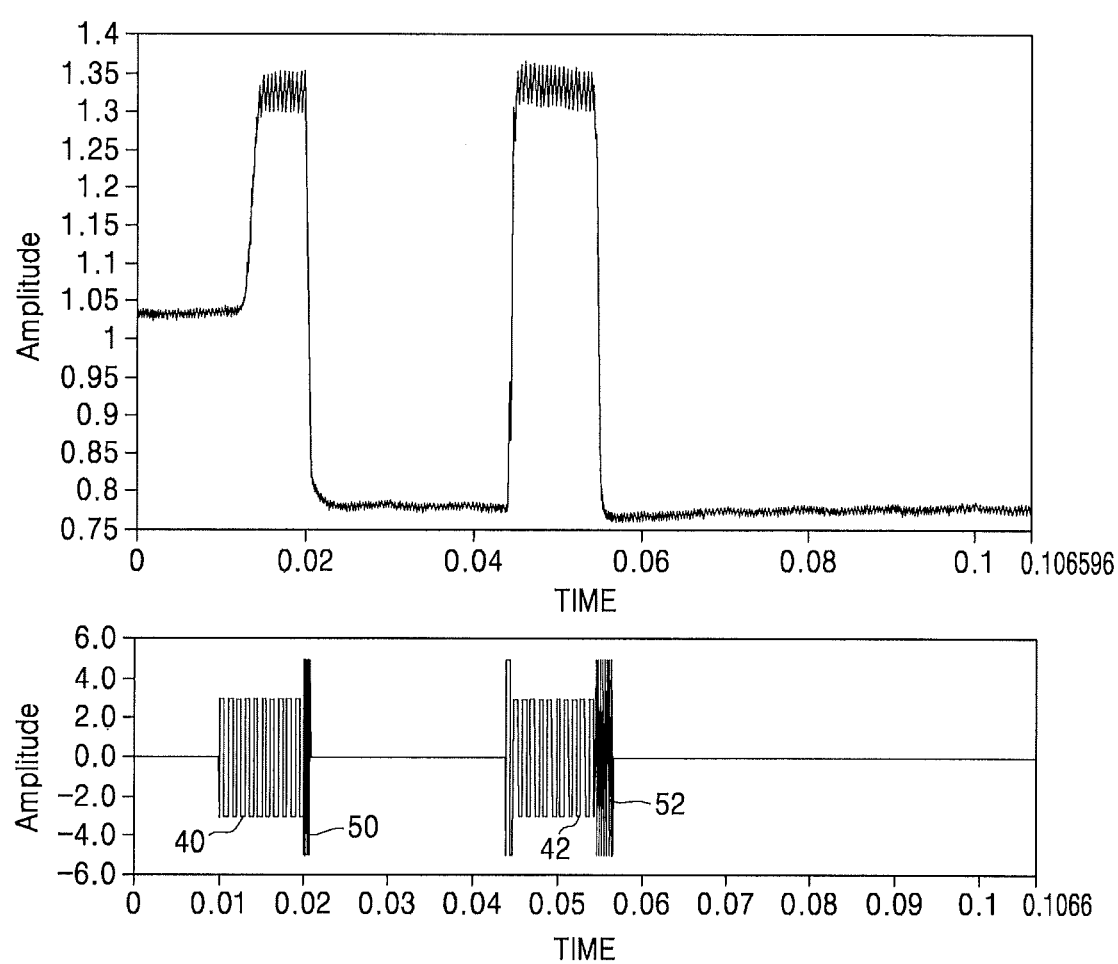
FIG. 3 is a time chart showing driving voltage with respect to a DFLC cell and an output of a light receiving device in the method of switching guest-host dual frequency liquid crystal by using back flow, according to an example embodiment.

FIG. 3 is a time chart showing a driving voltage with respect to a DFLC cell and an output of a light receiving device in the method of switching guest-host dual frequency liquid crystal by using back flow, according to an example embodiment.

In FIG. 3, numerals 40 and 42 refer to low frequency voltages, and numbers 50 and 52 refer to high frequency voltages.

Referring to FIG. 3, in a first section, that is, from 0 seconds to 0.01 seconds when a zero voltage is applied to the liquid crystal, the liquid crystal of the DFLC is oriented in a uniform and parallel state (a horizontal state). At this point, the liquid crystal may be oriented to have some degree of pre-tilt. The transmission in the first section may be at a medium level. The liquid crystal may have a high absorption rate with respect to a first polarized light, but has a low absorption rate with respect to a second polarized light which has a different polarized state from the first polarized light.

In a second section, that is, from 0.01 seconds to 0.02 seconds when a voltage of 30V having a frequency of 1 kHz and a square-wave form is applied to the liquid crystal, the liquid crystal of the DFLC is switched to a homeotropic state from a horizontal state. In the second section, since an absorption rate with respect to the first and second polarized lights is low, transmission is high.

In a third section, that is, from 0.02 seconds to 0.028 seconds when a voltage of 50V having a frequency of 60 kHz and a sine wave form is applied to the liquid crystal, the voltage applied to the DFLC is much higher than the threshold voltage that generates a back flow. Accordingly, the liquid crystal in the third section is switched to a 360° twisted state (a horizontal state) due to the back flow. Accordingly, the optical absorption rate of the liquid crystal with respect to the first and second polarized lights is increased and transmission is reduced. Due to the strong action of the back flow, switching is very fast. Since it takes time until the twisted state disappears, a low transmission state is maintained until a fourth section is reached.

In the fourth section, that is, from 0.0438 seconds to 0.0446 when a voltage of 50V having a frequency of 1 kHz and a square wave form is applied and in a fifth section, that is, from 0.0446 seconds and 0.0546 seconds when a voltage of 30 V having a frequency of 1 kHz and square wave form is applied to the liquid crystal, the DFLC is switched to a homeotropic state from the 360° twisted state. In the fourth and fifth sections, optical transmission is re-increased.

In a sixth section, that is, from 0.0546 seconds to 0.0566 seconds when a voltage of 50 V having a frequency of 60 kHz and a sine wave form is applied to the liquid crystal, the DFLC is switched to a horizontal state (360° twisted state) from the homeotropic state. Accordingly, the optical transmission is reduced again.

Figure 4:
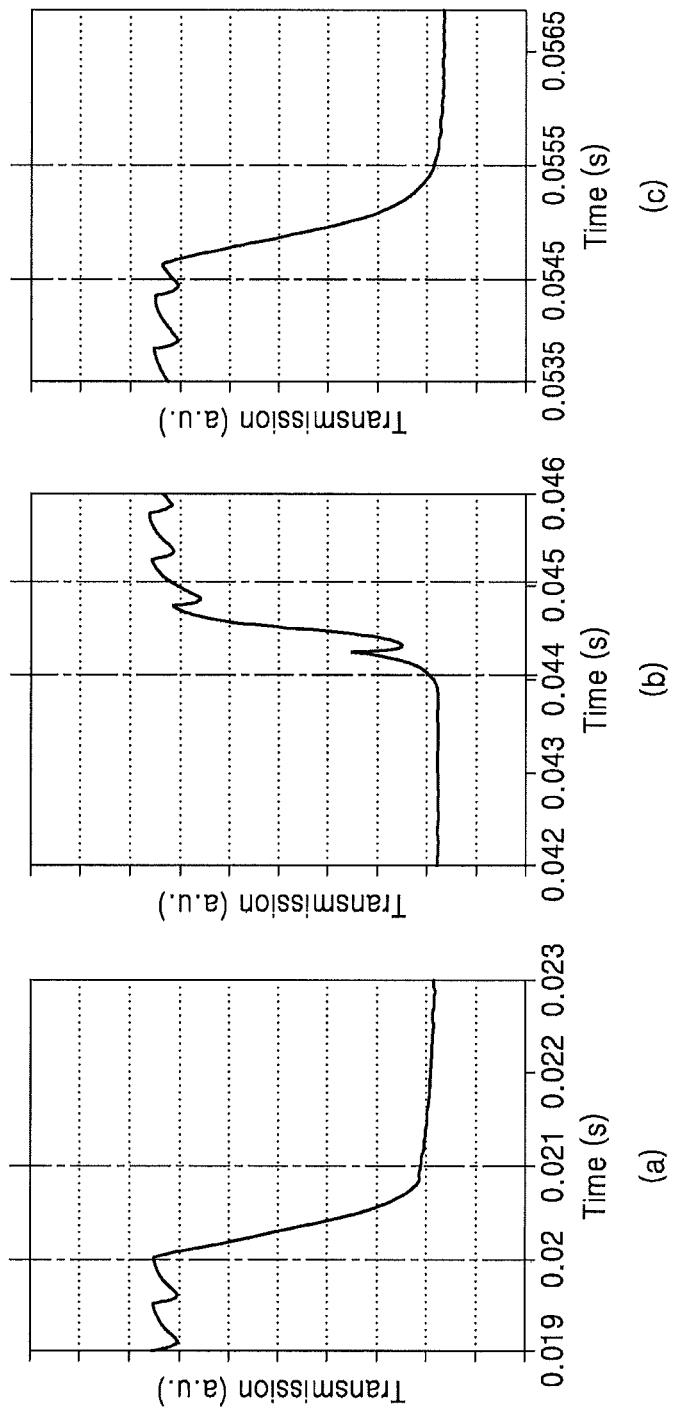
FIG. 4 is a graph showing a switching time at a section where a switching of FIG. 3 occurs.

FIG. 4 is a graph showing a switching time in a section where the switching of FIG. 3 occurs.

Graph (a) of FIG. 4 shows the switching time of the DFLC between the second section and the third section of FIG. 3, graph (b) shows the switching time of the DFLC when the third section is changed to the fourth section in FIG. 3. Graph (c) of FIG. 4 shows the switching time of the DFLC between the fifth section and the sixth section in FIG. 3.

Referring to FIG. 4, the ON→OFF switching time or OFF→ON switching time of the DFLC is 0.001 s.

FIG. 5 is a flow diagram showing a method of switching a guest-host dual frequency liquid crystal using a back flow, according to an example embodiment.

Referring to FIG. 5, in a first operation S1, a first voltage having a low frequency lower than a threshold voltage at which a back flow may occur, is applied to a guest-host dual frequency liquid crystal layer. Next, in a second operation S2, a second voltage having a high frequency higher than the threshold voltage is applied to the guest-host dual frequency liquid crystal layer. The first voltage may correspond to the voltage of 1 kHz and the second voltage may correspond to the voltage of 60 kHz described with reference to FIG. 3.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the apparatus described herein.

FIG. 6 is a cross-sectional view showing a case in which a dye is mixed in DFLC cells.

Referring to FIG. 6, a DFLC layer L1 is filled between two substrates 68 and 62 facing each other. The DFLC layer L1 may include an optical absorption dye 70 and liquid crystals 80. When the liquid crystals 80 are switched, the optical absorption dye 70 may be switched along the liquid crystals 80. The two substrates 68 and 62 may be transparent substrates, for example, glass substrates. Another DFLC layer may further be included below the substrate 62. At this point, an axis of other liquid crystals and an optical absorption dye of another DFLC layer may be perpendicular to the axis of the optical absorption dye 70 and the liquid crystals 80 of the DFLC layer L1.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of switching dual frequency liquid crystals of a shutter having a dual frequency liquid crystal layer between two transparent substrates, the method comprising:
    applying a first voltage having a first frequency to the dual frequency liquid crystal layer such that the dual frequency liquid crystals are switched to a homeotropic state; and
    applying a second voltage having a second frequency to the dual frequency liquid crystal, the second frequency being higher than the first frequency, such that the dual frequency liquid crystals are switched to a 360° twisted state due to a back flow generated around the dual frequency liquid crystals,
    wherein the second voltage is higher than a threshold voltage that generates a back flow around liquid crystals of the dual frequency liquid crystal layer, and
    the first voltage is lower than the threshold voltage.

2. The method of claim 1, wherein the dual frequency liquid crystal layer comprises an optical absorption dye.

3. The method of claim 1, wherein the first voltage has a form of a square wave.

4. The method of claim 1, wherein the second voltage has a form of a sine wave.

5. A method of switching dual frequency liquid crystals of a shutter having a dual frequency liquid crystal layer between two transparent substrates, the method comprising:
    changing a state of the dual frequency liquid crystal layer so that an optical transmission of the dual frequency liquid crystal layer is increased; and
    twisting the dual frequency liquid crystal layer 360° by generating a back flow around the liquid crystals of the dual frequency liquid crystal layer.

6. The method of claim 5, wherein the changing of the state of the dual frequency liquid crystal layer comprises changing liquid crystals of the dual frequency liquid crystal layer from a horizontal state to a homeotropic state.

7. The method of claim 5, wherein the back flow is generated by applying a voltage to the dual frequency liquid crystal layer that is greater than a threshold voltage that generates a back flow.

8. A method of switching dual frequency liquid crystals of a shutter having a dual frequency liquid crystal layer between two transparent substrates, the method comprising:
    applying a first voltage having a first frequency to the dual frequency liquid crystal layer such that the dual frequency liquid crystals are switched to a homeotropic state; and
    applying a second voltage having a second frequency to the dual frequency liquid crystal such that the dual frequency liquid crystals are switched to a 360° twisted state due to a back flow generated around the dual frequency liquid crystals,
    wherein the second voltage is higher than a threshold voltage that generates a back flow around liquid crystals of the dual frequency liquid crystal layer and the first voltage is lower than the threshold voltage.

9. The method of claim 8, wherein the second frequency is higher than the first frequency.

* * * * *